United States Patent [19]

Klingle et al.

[11] 4,252,462
[45] Feb. 24, 1981

[54] CHEMICAL LANDFILL

[75] Inventors: Ronald E. Klingle, Farrell; Gary W. Berman, Pittsburgh, both of Pa.

[73] Assignee: Industrial Service International Corp., Pittsburgh, Pa.

[21] Appl. No.: 7,679

[22] Filed: Jan. 30, 1979

[51] Int. Cl.³ .............................................. E02C 3/00
[52] U.S. Cl. ..................................... 405/129; 210/170
[58] Field of Search ................ 405/129, 128, 38, 270; 210/170, 10

[56] References Cited

U.S. PATENT DOCUMENTS

| | | | |
|---|---|---|---|
| 3,705,851 | 12/1972 | Brauer | 405/129 |
| 3,732,697 | 5/1973 | Dickson | 405/129 |
| 3,859,799 | 1/1975 | Jaco, Jr. | 405/128 |
| 3,930,590 | 1/1976 | Ebbrell | 220/18 |
| 4,016,073 | 4/1977 | Jordan | 405/129 |

FOREIGN PATENT DOCUMENTS

| | | | |
|---|---|---|---|
| 2422817 | 11/1975 | Fed. Rep. of Germany | 210/10 |
| 1403186 | 8/1975 | United Kingdom | 210/10 |
| 445622 | 7/1975 | U.S.S.R. | 210/10 |

*Primary Examiner*—Roy D. Frazier
*Assistant Examiner*—Alexander Grosz
*Attorney, Agent, or Firm*—Robert D. Yeager

[57] ABSTRACT

A landfill for the permanent disposal of wastewater sludge. The landfill includes an impoundment having a base that is substantially liquid impervious. Dikes supported by the base surround the perimeter of the base where needed. A liquid collection and conveying system is embedded in a liquid pervious layer which overlies the base; this system operates to dewater wastewater sludge deposited within the impoundment. The impoundment is adapted to be closed after the sludge is dewatered by spreading a liquid impervious layer over the dewatered sludge.

4 Claims, 6 Drawing Figures

CHEMICAL LANDFILL

BACKGROUND OF THE INVENTION

1. Field of the Invention

This invention relates to chemical landfills; more particularly to the disposal of contaminated wastewater sludges in a closable impoundment.

2. Description of the Prior Art

Growing public concern over pollution of the earth's water supply by industrial and municipal liquid waste has caused considerable attention to be focused on the proper treatment of wastewater before permitting it to come in contact with natural water sources. "Wastewater" as used herein means any liquid which contains an aqueous component together with contaminants either dissolved or suspended therein. Thus wastewater would include, among others, aqueous effluents from industrial activities and municipal sewage.

The typical wastewater treatment process involves the collection of dissolved or suspended contaminants and then the disposal of these collected contaminants which are commonly referred to as "sludge." Sludge, more precisely, comprises a mixture of solids (both insoluble and soluble) and water. Traditionally, disposal of sludge has been accomplished either by burying it in the ground or by incinerating it. The present invention is concerned only with the former, land disposal.

Various proposals have been made over the years for the land disposal of wastewater sludges but each has been unacceptable from the standpoint of modern water pollution standards. More specifically, the proposed disposal techniques either caused direct pollution of surface water or groundwater, or involved ultimate sludge disposition that indirectly resulted in such pollution, the latter occurring by virtue of dissolved contaminants in the water portion of the sludge mixture. Such contaminated solutions are unacceptable wastes in themselves and are capable of pollution if discharged to groundwater or surface water without proper treatment.

Exemplary of the problems involved in sludge disposal is the difficulty experienced in permanently and safely disposing of spent industrial acid solutions. Industrial acids are used in a variety of applications; a principal application is in the process of chemically removing oxides and scale from metals called "pickling." In the iron and steel industry, for example, pickling with dilute sulfuric and hydrochloric acid solutions finds wide use in the manufacture of sheet and tin plate products. In the pickling process, metal oxides on the metal surface being treated combine with the acid to form metallic salts which dissolve in the acid solution; as the concentration of metal salt increases, the acid solution loses its effectiveness and is considered "spent."

Some attempts have been made at regeneration of spent pickle liquors. However, because of the relatively low cost of acid, many industrial organizations prefer to dispose of the spent pickle liquor and have tried various alternatives. Neutralization of the acid material to precipitate insoluble reaction products is a widely-used initial step in pickle liquor disposal; this step is followed by some type of disposition of the precipitated sludge. Another disposal technique is to first remove the larger solids from the spent acid and then pump it into deep underground wells. This latter method is expensive and available only where geological conditions permit it.

The neutralization/sludge disposal technique for spent pickle liquor is confronted with a variety of problems. The process usually consists of mixing the waste liquor with lime or other alkaline agent to form metal hydroxides; this sludge-like material is then discharged into lagoons and permitted to settle. The supernatant liquid may or may not be removed and treated depending upon the circumstances. However, no attempt is made to dewater the sludge itself; as a result, the metal hydroxide sludge remains in a fluid, unstable condition in the lagoon; therefore, the lagoon cannot be covered. Further, conventional lagooning methods often ignore the fact that contaminated water, present either with the sludge mixture or resulting from rainfall, may migrate through the base of the lagoon to pollute subsurface ground water. This contaminated water, often called leachate, can be produced by chemical reversion in the neutralized sludge and will always pose a hazard when an open sludge lagoon is located in an area where rainfall exceeds the evaporation rate.

To overcome the problem of uncontrolled migration of leachate from an open lagoon, some sludge disposal systems have been constructed to make the disposal bed or lagoon impervious to liquid penetration. This technique prevents pollution of groundwater or surface waters through leachate migration; it does not, however, solve the problem of closure of the lagoon and, if anything, aggravates it because the watertight basin retains the sludge solids and water solution as a fluid, unstable mass.

SUMMARY OF THE INVENTION

The present invention overcomes the heretofore unsolved problems associated with wastewater sludge disposal, by providing an impoundment in which the deposited sludge is dewatered to form a stable, solid mass which may be safely and economically covered when the impoundment is filled. Further, the impoundment of the present invention is constructed to control the migration of leachate during both the time the impoundment is open and after it is closed, thereby preventing groundwater contamination.

The present invention provides a landfill construction and method for the permanent disposal of wastewater sludges. The landfill includes an impoundment having a base that is substantially impervious to penetration by liquids, the impoundment being adapted to retain wastewater sludge deposited therein. Disposed within the impoundment adjacent the base is means for collecting liquid percolating through the deposited sludge and conveying the liquid out of the impoundment.

Where necessary, the impoundment of the present invention includes a dike supported by the impoundment base and extending around the required portion of the perimeter of the base. In those sectors of the impoundment where dikes are constructed, the impoundment base preferably extends outboard of the dike to form a liquid retaining means which is substantially impervious to penetration by liquids.

The liquid collecting and conveying means within the impoundment of the present invention includes a layer of liquid pervious material having a drainage system embedded therein. Preferably, the drainage system comprises perforated pipes dispersed in the liquid pervious layer and communicating with a single collection point. Means for collecting supernatant liquid on the deposited sludges also may be connected to the drainage system.

The present invention further provides a process for permanently disposing of wastewater sludge in a landfill comprising: forming an impoundment having a base which is substantially impervious to liquid penetration; introducing wastewater sludge into the impoundment until it is substantially full; dewatering the sludge as it accummulates in the impoundment and thereafter by withdrawing water solutions from the sludge at locations adjacent the base of the impoundment; and closing the impoundment by spreading a liquid impervious material over the dewatered sludge.

Other advantages of the present invention will become apparent from a consideration of the following detailed description taken with the accompanying drawings in which:

DESCRIPTION OF THE PREFERRED EMBODIMENTS

Figure 1:
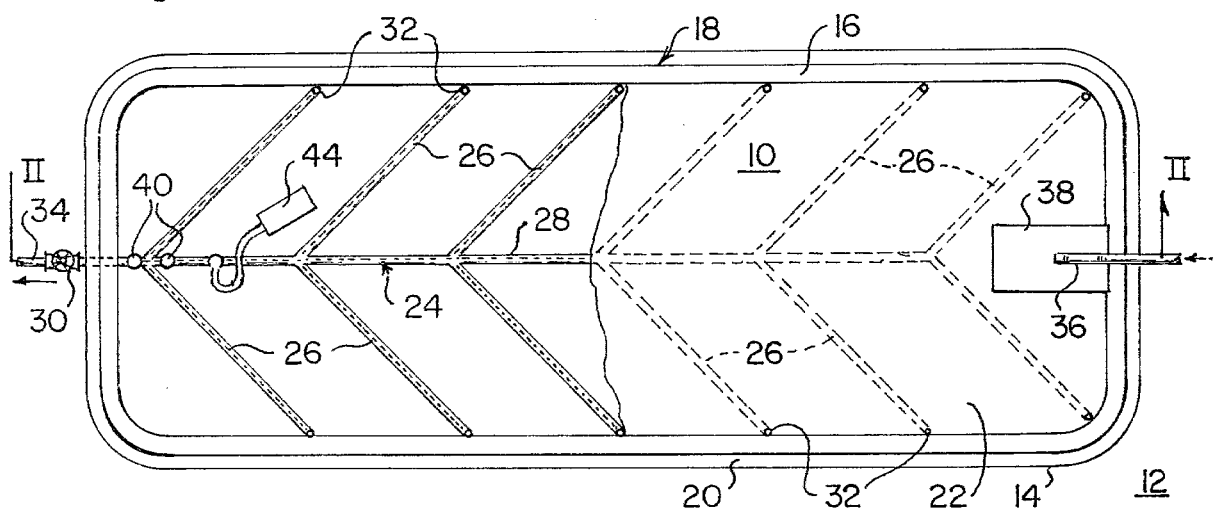
FIG. 1 is a schematic plan view of a chemical landfill with portions broken away to reveal details.
Figure 2:
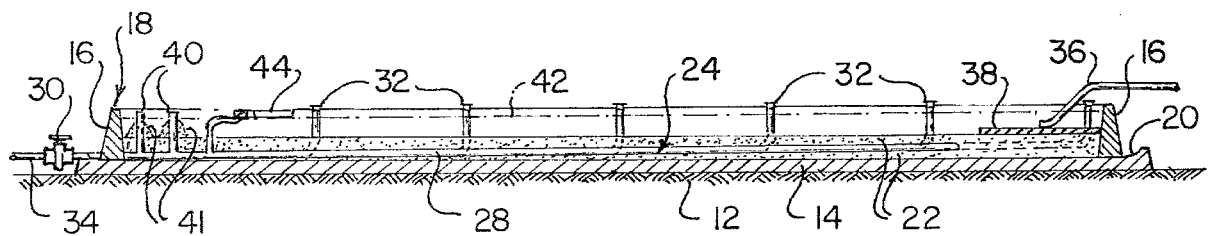
FIG. 2 is a schematic side elevation, partly in section, of the chemical landfill of FIG. 1.

Referring to FIGS. 1–5, there is shown a chemical landfill 10 embodying the present invention. Landfill 10 is constructed by first preparing the site which may encompass many acres of land. The existing ground is graded to form an earthen base 12 which may be flat, undulating or slightly sloping in any direction. The only practical constraint on the surface configuration of base 12 is the cost of the drainage system described hereinafter. An excessive number of slope changes in base 12 will unduly increase the cost of that drainage system.

A liquid impervious bed 14 of suitable thickness is installed on top of the entire area of base 12. A variety of well-known materials may be used to form bed 14 including cement or asphaltic concrete, clays, synthetic fabrics containing Hypalon, which is a DuPont trademark for a rubbery material obtained by the chlorination and sulfonation of polyethylene, and the like. One requirement of the material used for bed 14 is that it be chemically compatible with the overlying sludge mixture. For example, if a highly saline sludge mixture is to be in contact with bed 14, cement concrete and many types of clays are not suitable because of their tendency to degrade over a long term in a salt environment. In such a case, a bentonite clay which is resistant to saline conditions can be employed; e.g. Saline Seal TM 100, sold by American Colloid Company of Skokie, Ill. Another requirement of impervious bed 14 is that it remain impervious essentially forever. Accordingly, immediate and ultimate loadings on bed 14, taken with the structural stability of the ground comprising base 12, must be accounted for in selecting both the material and thickness of bed 14.

Dike walls 16 are formed along the perimeter of bed 14 to form an impoundment, generally designated by the reference numeral 18. Walls 16 are most economically formed of earth and are constructed of sufficient height to retain the desired volume of sludge plus an additional distance, usually a minimum of two feet, to provide freeboard for safety purposes. As will be described hereinafter, even more freeboard preferably is provided at the sludge inlet to the impoundment 18. The slope and thickness of the dike walls 16 of impoundment 18 are dependent upon the stability of the material of which they are constructed, and the character and height of the sludge to be placed in impoundment 18. In analyzing these variables, however, it should be borne in mind that dike walls 16 are not required to retain a true fluid having a depth equal to the height of the sludge because, as is soon to be described, the sludge within impoundment 18 is constantly being dewatered and thereby gaining its own stability.

It will be appreciated by those skilled in the art that substantial savings in construction costs can be effected by taking advantage of the natural contours of the terrain on which impoundment 18 is constructed. Thus, if some portion (or all) of the perimeter of impoundment 18 slopes upwardly from the intended earthen base 12, the construction of dike walls in that sector is unnecessary. An illustration of this feature appears in FIG. 4. There is shown earthen base 12 sloping upwardly to form a natural wall 19 for impoundment 18. Liquid impervious bed 14 extends up that slope to the desired height, which corresponds generally to the height of the adjoining man-made dike walls 16 of impoundment 18. In order to clearly distinguish walls 19 that are formed of natural contours (and have impervious lining material thereon) from man-made earthen dike walls 16 as described above, the term "dike" as used herein shall mean a wall of impoundment 18 that does not have liquid impervious material applied to its inner surface. Accordingly, a natural slope 19, forming part of the perimeter of impoundment 18 and having liquid impervious material extending up its surface, will be taken herein to be part of the base 12 of impoundment 18.

Figure 3:
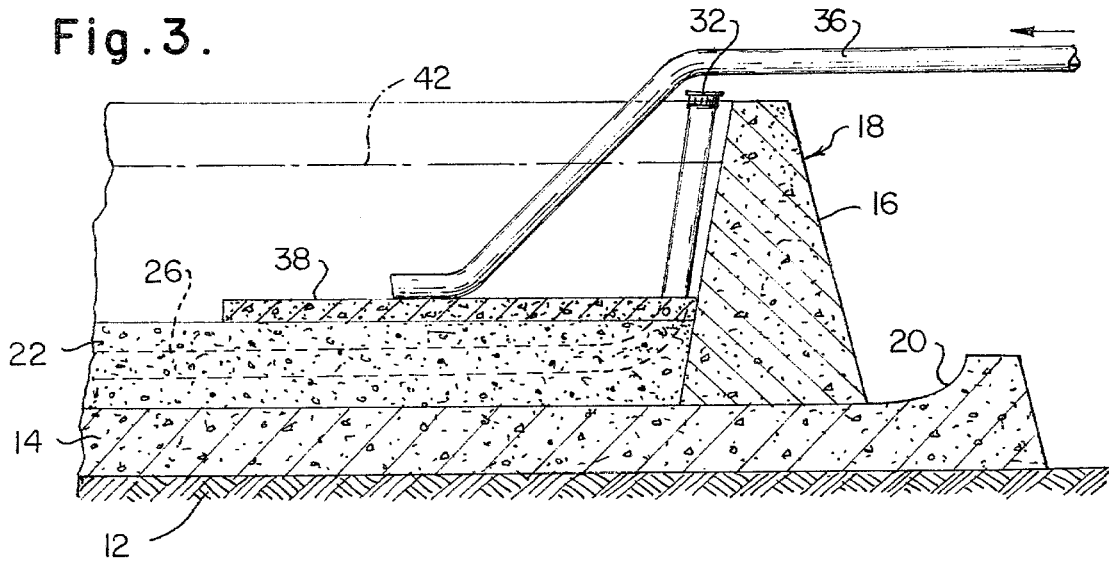
FIG. 3 is an exploded view of the right-hand portion of FIG. 2.
Figure 4:
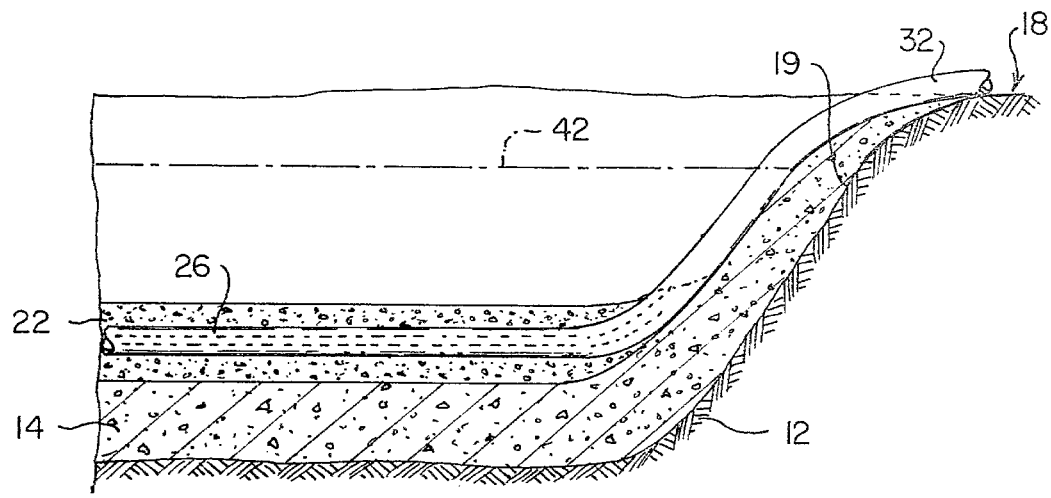
FIG. 4 is an exploded sectional view of a portion of the perimeter of the landfill shown in FIG. 1.
Figure 5:
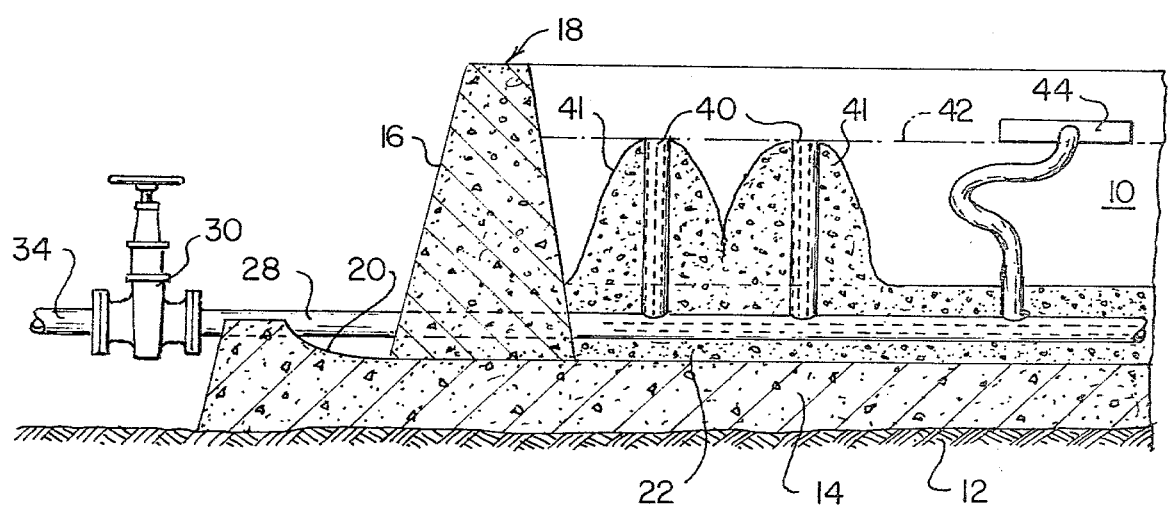
FIG. 5 is an exploded view of the left-hand portion of FIG. 2.

Dike walls 16 are placed directly on impervious bed 14 slightly inboard of its outer edges. As best shown in FIG. 3, the portion of bed 14 extending beyond dike walls 16 is turned upwardly to form a drainage swale 20 which completely encircles impoundment 18 except in those sectors where dikes are not needed. The purpose of this construction feature is to ensure that any seepage of water solution through dike walls 16 will be captured in swale 20 and thereby prevent pollution of surrounding surface water or groundwater.

A sludge dewatering system is installed within impoundment 18. This system includes a pervious layer 22 resting on impervious bed 14 and a lateral drainage system 24 embedded in pervious layer 22. Pervious layer 22 may be formed of any suitable material which, when placed under compression, permits water to percolate through it. Further, the material used in pervious layer 22 must maintain its porosity when contacted by the particular sludge being deposited within impoundment 18 and should be chemically inert to the sludge. An ideal material for use in many applications is shale but other materials such as appropriately sized gravel may be used.

Drainage system 24 is composed of suitably arranged segments of perforated pipe 26 embedded in pervious layer 22 and connected to a central header 28 which also may be perforated. Perforated pipe 26 and header 28 must be formed of material which is compatible with the sludge held in impoundment 18.

Drainage system 24 is laid out to effectively drain the entire impoundment 18 and is sloped (effectively to the left end in the drawings) to permit gravity flow of water solution collected in perforated pipes 26 to header 28 and thence to drainage system control valve 30. Standpipes 32 are connected to perforated pipes 26 to provide access for the insertion of cleaning tools into drainage system 24. Outlet 34 of central header, together with swale 20, may be connected to a water treatment plant (not shown). If desired, a central wall may be constructed to divide impoundment 18 into two lagoons, in which case each lagoon must have a separate drainage system 24.

Sludge to be deposited in impoundment 18 is discharged through inlet pipe 36 onto wearing surface 38 to prevent erosion of pervious layer 22 by the hydraulic force of the sludge. Wearing surface 38 may be a riprap, a concrete slab or other suitable material. After sufficient sludge depth is reached, the sludge itself acts as a wearing surface. The mouth of inlet pipe 36 is adjusted upwardly as the depth of the sludge mixture increases. As an alternate method of discharge if the base of impoundment 18 slopes to one end, sludge may be discharged initially into the low end of impoundment 18 until it backs up to inlet pipe 36 which would be positioned at the high end; with this technique, the sludge itself becomes wearing surface 38.

Vertical perforated drainpipes 40, which are surrounded by pervious material having the same purpose and characteristics as the material used in pervious layer 22, may be connected to header 28 near the low side of drainage system 24 to remove supernatant water from the sludge within impoundment 18. The surface of this supernatant water is designated in the drawings by the reference numeral 42. Floating skimmer 44 likewise may be connected to header 28 to aid in that removal process.

The operation of chemical landfill 10 will now be described. For purposes of illustrating the operation, the sludge to be disposed of within landfill 10 is produced by the neutralization of waste pickle liquor from a steel plant with various alkaline chemicals. The neutralization process is well known in the art and forms no part of the present invention except to the extent of producing the material for disposal. A typical pickle liquor neutralization process is described in Parsons, *Chemical Treatment Of Sewage And Industrial Wastes,* 1965 pp. 72–73, National Lime Association, which is incorporated by reference herein. The sludge mixture produced by the neutralization process has the following general analysis:

| pH | 6-9 |
|---|---|
| Settleable solids | 400–600 ml/l |
| Total suspended solids | 5000–200,000 mg/l |
| Total solids | 10,000–250,000 mg/l |
| Metals (including Fe, Cr, Ni, Cd, Zn, Pb, Cu, etc.) | 1000–150,000 mg/l |

The foregoing sludge is discharged into impoundment 18 through inlet pipe 36 until the entire impoundment area is covered. At that time, the drainage system control valve 30 is opened and the water solution collected from drainage system 24 and swale 20 is directed to a treatment plant. The introduction of sludge into impoundment 18 is continued either continuously or intermittently, until impoundment 18 is filled to the desired level. Continuously or intermittently throughout this introduction process, supernatant water is drawn off through vertical drainpipes 40 and skimmer 44, and the sludge is dewatered through drainage system 24. As alluded to earlier, the water solution obtained by these operations is processed in a treatment plant in accordance with well-known techniques to remove pollutants before discharging the water to natural sources. The water solution prior to treatment has the following characteristics:

| pH | 5-9 |
|---|---|
| Settleable solids | 0–20 ml/l |
| Total suspended solids | 100–1000 mg/l |
| Total solids | 5,000–100,000 mg/l |
| Metals | 50–1000 mg/l |

After undergoing conventional treatment by neutralization and sedimentation, the above water solution exhibits these characteristics and is substantially free of hazardous pollutants:

| pH | 6-9 |
|---|---|
| Settleable solids | 0 ml/l |
| Total suspended solids | <30 mg/l |
| Total solids | 5,000–100,000 mg/l |
| Metals | <10 mg/l |

After impoundment 18 is filled, the amount of water solution in the sludge mixture decreases with time and the sludge solids progressively gain stability.

Figure 6:
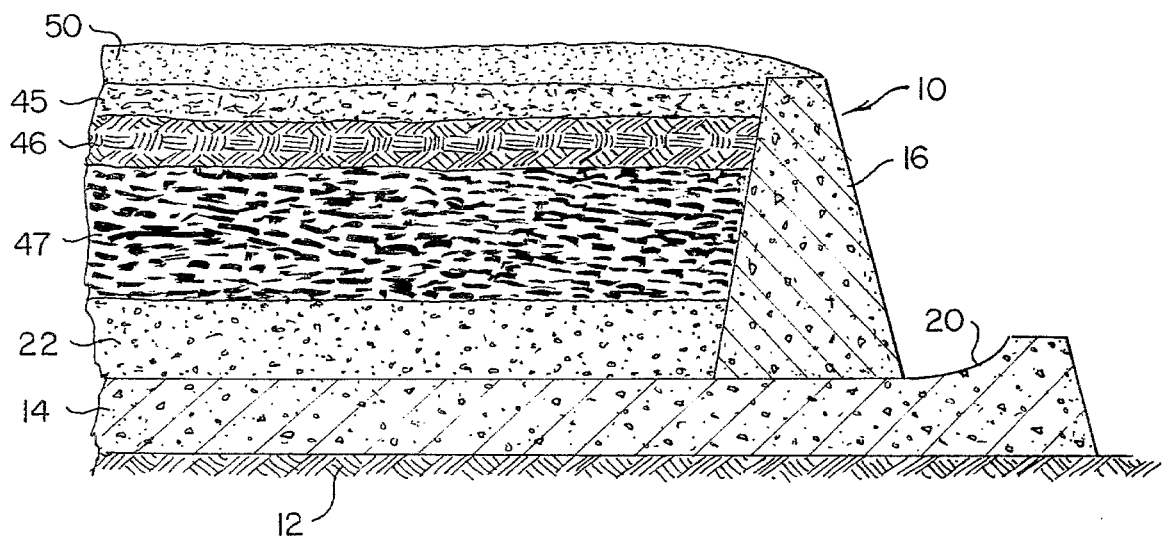
FIG. 6 is an enlarged sectional view of a portion of a chemical landfill closed in accordance with the present invention.

When the dewatered sludge within impoundment 18 reaches a stable condition, as measured by the ability of an average-size man to walk on the lagoon surface, closure of chemical landfill 10 may be commenced. Referring to FIG. 6, the closure operation begins by spreading earth 46 on sludge 47 over the entire impoundment area, generally starting from dike walls 16 and working toward the center. The depth of cover earth 46 is determined by the depth needed in the circumstances to support the earthmoving machine that performs the spreading operation. A clay or other liquid impervious material cover 45 is then spread on top of cover earth 46 and is graded and compacted. The depth of cover material 45 is determined by the type of material used and the stability of the underlying sludge 47; the purpose of cover material 45 is to prevent surface water penetration of impoundment 18 and that objective must be met. The grading of cover earth 46 should be carried out in such a manner as to ensure that ponding of rainwater will not occur. Finally, a topsoil layer 50 of six inches minimum is spread over the compacted liquid impervious cover 45 to permit the planting of vegetation. If trees are to be planted, the topsoil depth in the planting area must be sufficient to support tree root systems.

When closure is complete, chemical landfill 10 contains a structurally stable sludge material within a liquid impervious envelope. Water solution will continue in ever decreasing amounts to leach into drainage system 24 and be treated. Eventually, the flow of leachate will cease and chemical landfill 10 will be completely closed.

It will be appreciated by those skilled in the art that the disposal of extremely toxic wastewater sludges may necessitate a second liquid impervious bed 14 and associated pervious layer 22 with an embedded drainage system 24 on top of the one described above. The costs of constructing such multiple layers, however, may be economically unfeasable and require alternate disposal techniques for such sludges.

The wastewater processed in the disposal system just described essentially was an aqueous solution of inorganic materials, principally metal salts which upon neutralization with lime yield metal hydroxides and calcium salts; these precipitated hydroxides and calcium salts tend to stabilize well upon dewatering. The present invention also may be used to dispose of sludges produced from organic wastewater such as municipal sewage. It is necessary, however, to biologically stabilize organic sludges by such well known techniques as lime addition or allowing the biodegradable organics to be broken down through aerobic or anaerobic digestion.

Following biological stabilization, which essentially eliminates subsequent odor problems, the organic sludge may be deposited in the chemical landfill 10 of the present invention and processed generally in the same manner described above. Should the organic sludge tend to be less stable than desired upon dewatering, physical stabilization may be achieved in a variety of ways, e.g. mixing the organic sludge with sludge containing metal hydroxides and calcium salts or adding physical stabilization agents such as fly ash, limestone fines and the like to the deposited sludge. This permits closure of chemical landfill 10 in the same manner as described above.

What is claimed is:

1. A landfill for the permanent disposal of wastewater sludge comprising:
   an impoundment adapted to retain wastewater sludge deposited therein, said impoundment having a base that is substantially impervious to penetration by liquids, and said impoundment including a dike supported by said base inboard of the perimeter thereof and extending around at least a portion of the perimeter of said base, the portion of said base extending outboard of said dike being contoured to form a liquid retaining means;
   a layer of liquid pervious material overlying said base;
   a drainage system embedded in said liquid pervious layer and being effective to collect liquid percolating through said overlying deposited sludge, said drainage system including perforated pipes dispersed substantially throughout the area overlain by said deposited sludge and means for conveying said collected liquid out of said impoundment by gravity flow; and
   means for collecting supernatant liquid on said deposited sludge and conveying said collected supernatant liquid to said drainage system.

2. A process for disposing of wastewater sludge in a landfill comprising the steps of:
   forming an impoundment having a base which is substantially impervious to liquid penetration and having a dike supported by said base inboard of the perimeter thereof that extends around at least a portion of the perimeter of said base;
   providing within said impoundment, overlying said base, a layer of liquid pervious material;
   embedding in said liquid pervious layer a drainage system which includes perforated pipes dispersed substantially throughout said impoundment and includes supernatant liquid collection means;
   introducing wastewater sludge into said impoundment on top of said liquid pervious layer; and
   compacting said sludge by withdrawing therefrom through said drainage system water solutions, first by collecting said solutions, as they both percolate through said sludge and into said liquid pervious layer and accumulate on the surface of said sludge, in said perforated pipes and with said supernatant liquid collection means, respectively, and then conveying said solutions out of said impoundment by gravity flow.

3. A process as recited in claim 2 which further comprises the step of:
   closing said impoundment after said sludge is compacted by spreading thereover a liquid impervious material.

4. A process as recited in claim 3 which further comprises the step of:
   withdrawing water solutions through said drainage system as they percolate through said compacted sludge and into said liquid pervious layer.

* * * * *

UNITED STATES PATENT AND TRADEMARK OFFICE
CERTIFICATE OF CORRECTION

PATENT NO. : 4,252,462
DATED : February 24, 1981
INVENTOR(S) : Ronald E. Klingle & Gary W. Berman It is certified that error appears in the above-identified patent and that said Letters Patent are hereby corrected as shown below:

Col. 3, line 58, delete "Seat" and substitute therefor --Seal--; and

Col. 7, line 37, delete the first occurrence of "a" and substitute therefor --at--.

Signed and Sealed this

Second Day of June 1981

[SEAL]

Attest:

RENE D. TEGTMEYER

Attesting Officer   Acting Commissioner of Patents and Trademarks